(12) United States Patent
Takahashi

(10) Patent No.: US 7,449,797 B2
(45) Date of Patent: Nov. 11, 2008

(54) STORAGE APPARATUS POWER SUPPLY UNIT AND STORAGE APPARATUS MANAGEMENT METHOD

(75) Inventor: Hideaki Takahashi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 144 days.

(21) Appl. No.: 11/449,665

(22) Filed: Jun. 9, 2006

(65) Prior Publication Data

US 2007/0240017 A1 Oct. 11, 2007

(30) Foreign Application Priority Data

Apr. 11, 2006 (JP) .............................. 2006-108255

(51) Int. Cl.
*H02J 7/34* (2006.01)
(52) U.S. Cl. ........................................ 307/52
(58) Field of Classification Search ............... 307/19, 307/20, 21, 29, 39, 44, 65, 80, 52, 45; 700/293, 700/295; 714/14; 713/340; 702/59; 324/512
See application file for complete search history.

(56) References Cited

U.S. PATENT DOCUMENTS

| | | | | |
|---|---|---|---|---|
| 5,637,933 A | * | 6/1997 | Rawlings et al. | ............ 307/147 |
| 5,936,318 A | * | 8/1999 | Weiler et al. | ................... 307/66 |
| 6,643,566 B1 | * | 11/2003 | Lehr et al. | ................... 700/286 |
| 6,680,840 B2 | * | 1/2004 | Brooks | ........................ 361/160 |
| 6,867,701 B2 | * | 3/2005 | Lawrence et al. | ............ 340/635 |
| 7,051,233 B2 | * | 5/2006 | Fukumori et al. | .............. 714/14 |
| 7,132,951 B2 | * | 11/2006 | Ziejewski et al. | ............ 340/635 |
| 7,170,194 B2 | * | 1/2007 | Korcharz et al. | .............. 307/21 |
| 7,245,044 B2 | * | 7/2007 | Woltereck et al. | .............. 307/29 |
| 2004/0201931 A1 | * | 10/2004 | Korcharz et al. | .............. 361/18 |
| 2007/0038748 A1 | * | 2/2007 | Masuyama | ................... 709/225 |

FOREIGN PATENT DOCUMENTS

JP 11-168832 12/1997
JP 2004-120825 9/2002

* cited by examiner

*Primary Examiner*—Michael J Sherry
*Assistant Examiner*—Michael Rutland Wallis
(74) *Attorney, Agent, or Firm*—Reed Smith LLP; Stanley P. Fisher, Esq.; Juan Carlos A. Marquez, Esq.

(57) ABSTRACT

In a power supply unit for a storage apparatus according to the present invention, it is possible to detect a power supply abnormality inside a device of another company, for which environment information is not directly acquirable. For a load device provided by a vendor that differs from the vendor of the storage apparatus, information cannot be directly exchanged with the control part. In this load device, power is supplied from a power distribution unit. Accordingly, a load device 4 power abnormality is detected by monitoring the state of the power being supplied to the load device inside a power distribution unit. The control part outputs the detected power abnormality by associating the abnormality to the configuration of the storage apparatus.

2 Claims, 15 Drawing Sheets

FIG. 7

| PDU PORT MANAGEMENT TABLE (T1) ||||||
|---|---|---|---|---|---|
| CONNECTION INFORMATION (T11) || POWER REDUNDANCY INFORMATION (T12) || FAILURE DETERMINATION THRESHOLD VALUE (T13) ||
| PDU_ID | PORT NUMBER | CONNECTION DESTINATION POWER SUPPLY PART ID | REDUNDANCY | REDUNDANT POWER SUPPLY PART ID | LOW CURRENT | OVERCURRENT |
| SUB-PDU21 | 1 | SL21-1 | YES | SL21-2 | IL(SL21-1) | IH(SL21-1) |
| | 2 | SL22-1 | YES | SL22-2 | IL(SL22-1) | IH(SL22-1) |
| | ... | ... | ... | ... | ... | ... |
| | n | SL2n-1 | YES | SL2n-2 | IL(SL2n-1) | IH(SL2n-1) |
| SUB-PDU22 | | | | | | |
| SUB-PDU23 | | | | | | |
| ... | ... | ... | ... | ... | ... | ... |
| SUB-PDU11 | 1 | SL11-1 | YES | SL11-2 | IL(SL11-1) | IH(SL11-1) |
| | 2 | SL12-1 | YES | SL12-2 | IL(SL12-1) | IH(SL12-1) |
| | ... | ... | ... | ... | ... | ... |
| | n | SL1n-1 | YES | SL1n-2 | IL(SL1n-1) | IH(SL1n-1) |

FIG. 9

PDU CONNECTION RELATIONSHIP MANAGEMENT TABLE (T2)

| PDU_ID | SUPER PDU EXISTS? | SUPER-PDU_ID |
|---|---|---|
| SUB-PDU11 | YES | SUPER-PDU1 |
| SUB-PDU12 | YES | SUPER-PDU2 |
| SUB-PDU21 | YES | SUPER-PDU1 |
| SUB-PDU22 | YES | SUPER-PDU2 |
| SUPER-PDU1 | NO | — |
| SUPER-PDU2 | NO | — |

| PDU CONNECTION RELATIONSHIP MANAGEMENT TABLE | | |
|---|---|---|
| PDU_ID | SUPER PDU EXISTS? | SUPER-PDU_ID |
| PDU1 | YES | PDU2 |
| PDU2 | YES | PDU3 |
| PDU3 | YES | PDU4 |
| ... | ... | ... |
| PDUn-1 | YES | PDUn |
| PDUn | NO | — |

STORAGE APPARATUS POWER SUPPLY UNIT AND STORAGE APPARATUS MANAGEMENT METHOD

CROSS-REFERENCE TO RELATED APPLICATIONS

This application relates to and claims priority from Japanese Patent Application No. 2006-108255 filed on Apr. 11, 2006, the entire disclosure of which is incorporated herein by reference.

BACKGROUND OF THE INVENTION

1. Field of the Invention

The present invention relates to a storage apparatus power supply unit and a storage apparatus management method.

2. Description of the Related Art

A storage apparatus comprises a storage part, which is connected to a plurality of hard disk drives in an array, and provides a logical storage region (logical volume) to a server or other such host computer (hereinafter, "host").

To enhance reliability and availability, a storage apparatus provides a host with redundant storage regions based on RAID (Redundant Array of Independent Disks). Further, in a storage apparatus, various resources, such as microprocessors and communication channels, are made redundant. The power supply unit for a storage apparatus is also made redundant from the standpoint of this kind of high reliability and high availability.

In the prior art, a plurality of hard disk drives is treated as a group, and a plurality of power supply units is respectively allocated to each group (Japanese Laid-Open Patent No. 11-168832). Under normal circumstances, power is supplied to the respective hard disk drives inside a group from one power supply unit, and if the one power supply unit should malfunction, the storage apparatus automatically switches to another power supply unit, and power is supplied to the respective hard disk drives from this other power supply unit.

However, most storage apparatuses, for example, use a standard casing stipulated by ANSI (American National Standards Institute) standards. A standard casing like this comprises a plurality of slots. Various devices, whose external dimensions are standardized like those of rack-mounted devices, can be mounted to the respective slots.

When a standard casing has an open slot, a user will sometimes mount another company's product, which is related to a storage system, to the open slot. Another company's product refers to a product, which is supplied from a vendor that differs from the storage apparatus vendor. Since power is supplied to the respective slots from a power supply part inside the storage apparatus, the other company's product can achieve the prescribed functionality by receiving a supply of power from the storage apparatus.

Furthermore, although not storage apparatus-related technology, in the field of distribution boards, a device for measuring the current value of respective bifurcated bus lines, which branch off from the trunk bus line, is known (Japanese Laid-Open Patent No. 2004-120825).

A storage apparatus is a relatively large-scale, complex system product, which comprises a plurality of disk drives, a controller, a power system and various other devices (functional parts), and also comprises characteristics that require high reliability and high availability.

Therefore, to maintain high reliability and high availability in a storage apparatus, environment information of various devices mounted on a storage apparatus is acquired either on a regular or irregular basis in preparation for the occurrence of a failure in a device. Environment information, for example, can refer to information related to the power supply built into the respective devices.

However, when another company's product is mounted to an open slot in a casing in accordance with a user's situation, the storage apparatus is not able to acquire the environment information of the other company's product. This is because the other company's product only comprises standardized external dimensions, and the storage apparatus simply supplies power to the other company's product, which is mounted to the casing.

In particular, most storage apparatuses are utilized by incorporating them into a data processing system that uses a storage apparatus. In a data processing system such as this, for example, other types of apparatuses besides a storage apparatus, such as a switching apparatus, a NAS (Network Attached Storage) system, a web server, and a security server, are also used. Thus, a user will mount another company's server, or switching apparatus to an open slot on a storage apparatus to make effective use of installation space.

Even when the company's product is mixed together with other companies' products inside a casing, the storage apparatus is capable of managing the state of one's own product. However, under normal circumstances, the storage apparatus is not able to manage the state of another company's product inside the casing. This is because the other company's product in this case simply borrows the open space of the storage apparatus and receives a supply of power.

SUMMARY OF THE INVENTION

With the foregoing in mind, an object of the present invention is to provide a storage apparatus power supply unit constituted so as to detect an abnormality of a load device and provide output associated to the configuration of the storage apparatus by monitoring the state of the power being supplied to this load device from a power distribution unit. Additional objects of the present invention should become clear from the disclosures of the embodiments explained hereinbelow.

To solve for the above-mentioned problems, a storage apparatus power supply unit according to one aspect of the present invention comprises at least one or more power distribution units for supplying power from a power supply part by distributing the power to the above-mentioned load devices; and a controller, which is communicatively connected to the power distribution unit. A power distribution unit comprises a power supply port for supplying power to the load devices; a detection part for detecting the state of power, which is being supplied to the load devices from the power supply port, and outputting a detection signal; and a monitoring part for detecting a load device power abnormality by monitoring a detection signal outputted from the detection part, and notifying the controller. The controller, based on a notification from the monitoring part, outputs a detected power abnormality by associating the abnormality to the configuration of the storage apparatus.

The controller can specify a load device for which a power abnormality has been detected by using management information preset with the corresponding relationship between the load device and the power supply port, and can output to a display the location of the power abnormality-detected load device in the storage apparatus.

When a load device for which an abnormality has been detected is connected to a first power distribution unit and a second power distribution unit, which differ from one another, and the power system has redundancy, the controller can output alert information related to a prescribed power distribution unit, which is connected to a normal power system that differs from the power system for which an abnormality has been detected, of either the first power distribution unit or the second power distribution unit. For example, alert information is information, which restricts the operation of the prescribed power distribution unit.

When a prescribed power distribution unit is one that distributes power from a power supply part via either one or a plurality of yet different superordinate power distribution units, the controller can also output, as alert information, information, which respectively restricts the operation of the prescribed power distribution unit and the superordinate power distribution unit.

Here, the power distribution unit is detachably mounted to the storage apparatus as a replacement component.

A storage apparatus according to another aspect of the present invention comprises a load device of a first type, which has a casing, a controller disposed in the casing, a power supply part disposed in the casing, an interface for notifying environment information to the controller, and a redundant power system; a load device of a second type, which has a casing, and a redundant power system; and a first power distribution unit and a second power distribution unit, which are detachably disposed in a casing, and which supply power from a power supply part to the respective load devices. A power distribution unit comprises a power supply port for supplying power to a load device; a detection part, which detects the state of the power being supplied to a load device from the power supply port, and outputs a detection signal; and a monitoring part, which detects a power supply part abnormality in a load device by monitoring a detection signal outputted from the detection part, and notifies the controller. The controller is constituted so as to specify a load device, for which a power abnormality has been detected, using management information preset with the corresponding relationship between the load device and the power supply port, output information related to this specified load device, and specify a prescribed power distribution unit, from among the first power distribution unit or the second power distribution unit, which is connected to the normal power system of the specified load device, and to output alert information for restricting the operation to this specified prescribed power distribution unit.

A management method of a storage apparatus according to yet another aspect of the present invention is a management method for managing the power abnormality state of at least one or more load devices disposed in the storage apparatus, wherein a plurality of power distribution units for supplying power from a power supply part is connected to each load device, and the management method respectively executes the steps of detecting respective states of the power being supplied to a load device from the power distribution units; determining whether or not a power failure has occurred by comparing the detected power state against a preset threshold value; specifying, when determined that a power failure occurred, the load device in which the power failure occurred within the configuration of the storage apparatus by using management information, in which the corresponding relationship between load device identification information and power system redundancy-related information, and a power distribution unit are set beforehand; outputting a first alert information related to the specified load device; determining, through the use of management information, whether or not the specified load device comprises a redundant power system; specifying, when determined that the specified load device comprises a redundant power system, the power distribution unit connected to the normal side power system; and outputting a second alert information related to the specified power distribution unit.

BRIEF DESCRIPTION OF THE DRAWINGS

FIG. 7 is a schematic diagram showing a table for managing a PDU port;

FIG. 9 is a schematic diagram showing a table for managing the connection relationship between PDUs;

FIG. 11 is a schematic diagram showing a table for managing the connection relationship shown in FIG. 10;

DESCRIPTION OF THE PREFERRED EMBODIMENTS

An embodiment of the present invention will be explained hereinbelow on the basis of the figures. In this embodiment, as will be described below, in an environment in which the company's product is mixed together with other companies' products, it is possible to manage at least a portion of the state of another company's product by monitoring a power supply line, which is the point of contact (or interface) with the other company's product, thus improving the usability and reliability of the storage apparatus.

Figure 1:
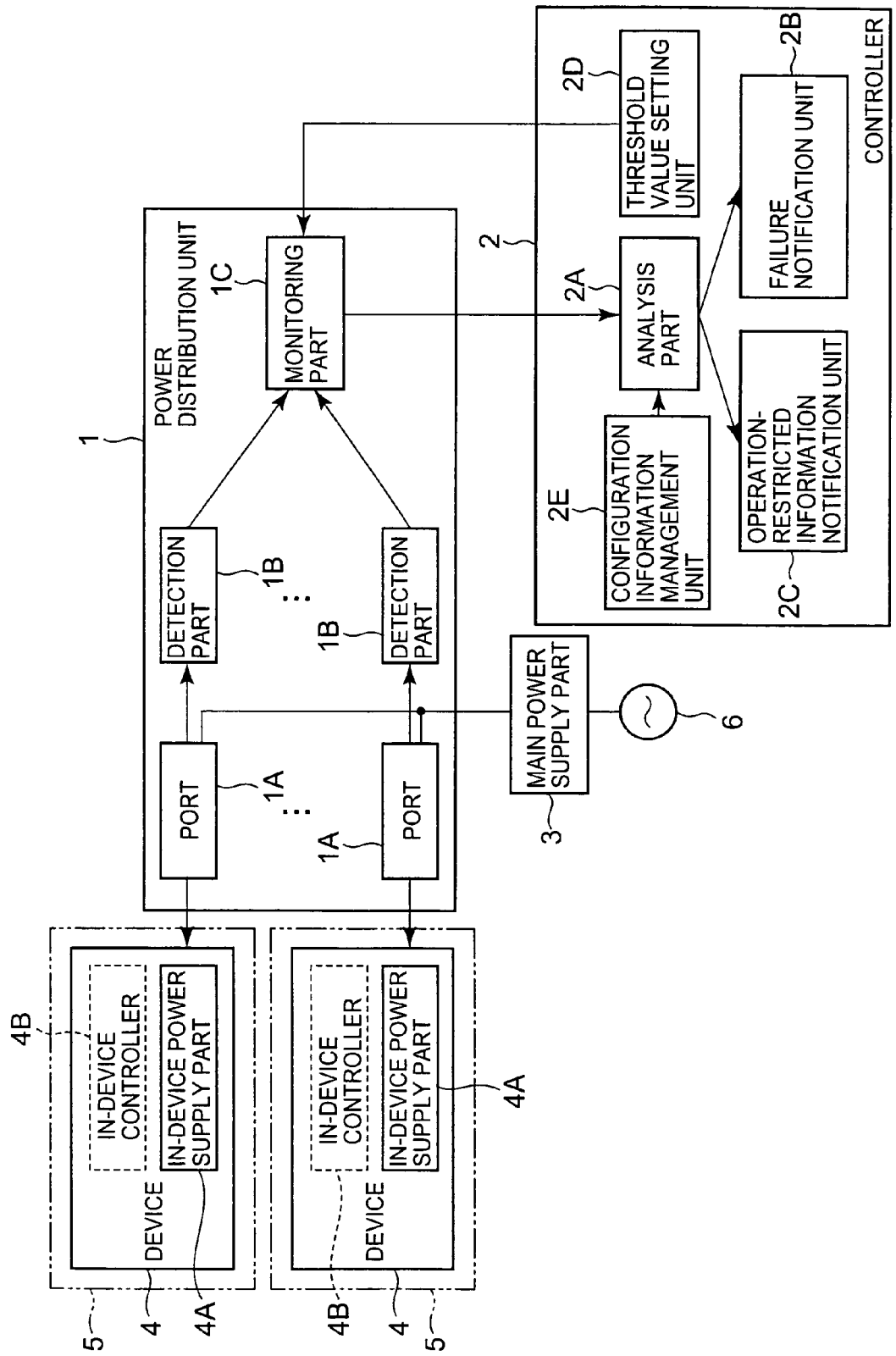
FIG. 1 is a schematic diagram showing the concept of an embodiment of the present invention.

FIG. 1 is a block diagram showing the overall concept of a power supply unit for a storage apparatus according to this embodiment. This power supply unit, for example, is constituted comprising at least one or more power distribution units 1, a controller 2, and a power supply part 3.

Either one or a plurality of slots 5 is provided in the casing of the storage apparatus. A variety of load devices 4 can be mounted in these slots 5. For example, a switching apparatus, file server, security server, web server and the like can be cited as load devices 4. A load device 4, for example, is constituted comprising an in-device power supply part 4A and in-device controller 4B. An in-device power supply part 4A, for example, is a circuit for supplying a prescribed power to the circuits inside a load device 4. An in-device controller 4B, for example, is a circuit for controlling the operation and functionality of a load device 4.

From the vendor's standpoint, load devices 4 can be broadly divided into the company's product and other companies' product. The company's product is a load device provided by the same vendor as the storage apparatus vendor. Another company's product is a load device provided by a vendor, who differs from the storage apparatus vendor. If a load device 4 is the company's product, the in-device controller 4B of this load device 4 comprises a controller 2 located external to the load device 4, and a management interface for exchanging information with the controller 2. Therefore, the controller 2 can acquire information related to the internal state (environment information) of the load device 4. The controller 2 notifies the user of the management state of the load device 4 based on this acquired environment information.

By contrast, when a load device 4 is another company's product, the in-device controller 4B of this load device 4 does not comprise a management interface for transferring environment information to the controller 2. Under normal circumstances, the proprietary management interface, which another company's product load device 4 comprises, for example, is not able to communicate with the controller 2 because the protocol specifications will differ from those of the controller's 2 management interface. However, if a special circuit and program are used to connect this proprietary management interface to the management interface of the controller 2, it is possible for the controller 2 and in-device controller 4B to exchange information.

Therefore, under normal circumstances, a load device 4 of another company's product provided inside the storage apparatus is only associated to the storage apparatus in two ways: by the fact that it utilizes a slot 5 of the storage apparatus, and the fact that it receives a supply of power from the power supply part 3 of the storage apparatus. Thus, even if some kind of abnormality should occur to the in-device power supply part 4A, bringing the functions of the load device 4 to a halt, the controller 2 of the storage apparatus cannot immediately detect the occurrence of this failure. Moreover, for example, when the functional stoppage of the load device 4 impacts the information processing of the storage apparatus controller 2, it is possible that the controller 2 will be able to indirectly detect the failure of the load device 4, which is another company's product, in a delayed fashion following the occurrence of the failure.

Accordingly, this embodiment provides the power distribution unit 1 and controller 2 with a new constitution that makes effective use of subtle contact with another company's load device 4 by which environment information cannot be easily acquired, to detect a failure that occurs in the other company's load device 4.

The power distribution unit 1 is a circuit for supplying power to the in-device power supply part 4A of a load device 4, and, for example, is constituted comprising either one or a plurality of power supply ports 1A, a detection part 1B, and a monitoring part 1C.

A power supply port 1A, for example, is connected to an in-device power supply part 4A via a power cord or other such feed channel, and supplies alternating current power from the power supply part 3. The power supply part 3 supplies alternating current power inputted from the power supply 6 of the customer, which is provided in the place where the storage apparatus is installed, either as-is or by converting to voltage, to a power supply port 1A of the power distribution unit 1.

The in-device power supply part 4A converts the alternating current power inputted from a power supply port 1A to direct current power of a prescribed voltage, and supplies it to the various parts of the load device 4 (for example, the in-device controller 4B). Furthermore, the explanation given here cites an example of when alternating current power is supplied from the power distribution unit 1 to a load device 4, but the present invention is not limited to this, and the constitution can also be such that direct current power is supplied to a load device 4 from the power distribution unit 1. In this case, the in-device power supply part 4A is constituted comprising a DC-DC converter.

The detection part 1B is a sensor for detecting the power supply state of the power supply ports 1A. A detection part 1B, for example, can be constituted as a contactless current sensor, which detects a current value based on magnetic changes in the power supply channel. Furthermore, besides a contactless current sensor, the constitution can also be such that a current detecting resistor disposed midway along the power supply channel is used.

The monitoring part 1C is connected to the respective detection parts 1B, and monitors the respective values of the current flowing through the power supply ports 1A based on the detection signals from the detection parts 1B. A prescribed threshold value is set beforehand in the monitoring part 1C by a threshold value setting unit 2D inside the controller 2. The monitoring part 1C determines whether or not a power failure had occurred in each of the power supply ports 1A by comparing a threshold value set by the threshold value setting unit 2D against a detection signal from a detection part 1B. The monitoring part 1C notifies the controller 2 of failure detection when the occurrence of a power failure is detected.

The controller 2 controls the overall operation of the storage apparatus. The controller 2, in addition to a constitution for controlling the fundamental operations of the storage apparatus, for example, is constituted comprising an analysis part 2A, failure notification part 2B, operation-restricted information notification part 2C, threshold value setting part 2D, and configuration information management part 2E. Furthermore, as the fundamental operations of the storage apparatus, for example, it is possible to cite a function for reading data from a volume in accordance with a read request from a host, a function for writing data to a volume in accordance with a write request from a host, and a function for creating a volume in accordance with instructions from a host or a management terminal.

The analysis part 2A is connected to the monitoring parts 1C of the respective power distribution units 1. In the figure, for the sake of expediting the explanation, only one power distribution unit 1 is shown, but in actuality, a plurality of power distribution units 1 is provided. The analysis part 2A analyzes failure detection information notified from the monitoring part 1C by referencing the management information managed by the configuration information management part 2E, and specifies the load device 4 in which a power failure has occurred.

The configuration information management part 2E, for example, makes correspondent and manages the corresponding relationship between the power supply ports 1A and the slots 5, and the presence or absence of redundancy in the in-device power supply part 4A. The monitoring part 1C notifies the analysis part 2A of identification information (the port ID) for identifying the power supply port 1A where a power failure was detected. Therefore, the analysis part 2A is able to specify the slot 5 in which the load device 4 that suffered a power failure is mounted based on the notified port ID and the information managed by the configuration information management part 2E.

The failure notification part 2B notifies the user of information related to a load device 4 in which a power failure was detected. This failure notification is carried out relative to either the logical constitution or the physical constitution of the storage apparatus. That is, the failure notification part 2B, for example, outputs to a screen for a load device 4 mounted to the storage apparatus the number of the slot 5 in which this load device is mounted, its location inside the casing, and the type and name of the load device.

The operation-restricted information notification part 2C outputs to a screen information regarding the power distribution unit 1, which is associated to the load device 4 in which a failure occurred, to the effect that the operation of this power distribution unit 1 will be restricted. For example, when a plurality of in-device power supply parts 4A is provided in a load device 4, and the load device 4 comprises a redundant power system, operations for halting the functions and replacement of the power distribution unit 1, which is connected to a normal-side in-device power supply part 4A, will be restricted. The prohibition of operation is included in the restriction of operations here. Furthermore, notification of a failure and the notification of operation-restricted information can not only be achieved by outputting a display to a screen, but rather is also achievable by reading out a voice message.

By virtue of the constitution described hereinabove, this embodiment can detect a failure that occurs in a load device 4 on the basis of the state (current value) of the power supply to an in-device power supply part 4A. For example, when a load device 4 stops functioning due to a failure, the current value being supplied to the in-device power supply part 4A drops below what the current value is at normal times. Further, it is also possible to determine that a failure has occurred in a load device 4 when excess current is supplied to an in-device power supply part 4A.

Thus, a failure that occurs in a load device 4 can be detected by monitoring the state of the power being supplied from a power distribution unit 1 to the load device 4, and this detected failure can be notified to the user. This enhances the usability of the storage apparatus, and also heightens reliability. This is because environment information can be acquired, albeit in a limited condition, from another company's load device 4.

Furthermore, the constitution can also be such that the monitoring part 1C is disposed inside the controller 2. However, disposing the monitoring part 1C inside the controller 2 increases the number of signal lines between the controller 2 and the respective power distribution units 1. By contrast, as explained above, if the constitution is such that a monitoring part 1C is provided inside each of the respective power distribution units 1, and the monitoring parts 1C are connected to the controller 2 by a signal line, it is possible to decrease the number of signal lines between the controller 2 and the respective power distribution units 1. This embodiment will be explained in detail hereinbelow.

First Embodiment

Figure 2:
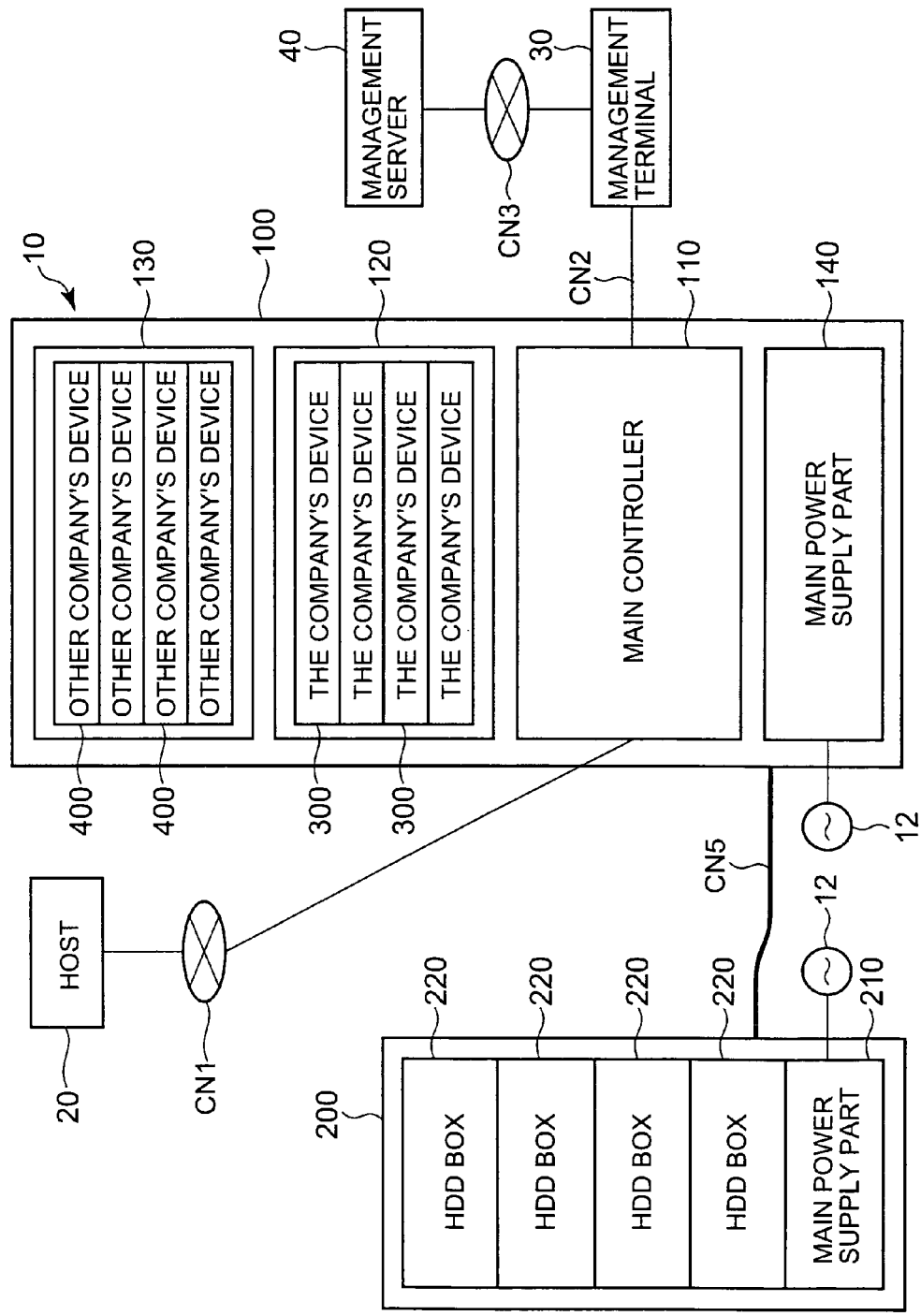
FIG. 2 is a schematic diagram showing the overall constitution of a storage system comprising a storage apparatus.

FIG. 2 is a diagram schematically showing the overall constitution of a storage system comprising a storage apparatus. This storage system, for example, can comprise a storage apparatus 10, a host 20, a management terminal 30 and a management server 40.

Details of the storage apparatus 10 will be explained further below. The host 20, for example, is constituted as a computer device, such as a server computer, mainframe machine or the like. The host 20, for example, is connected to a main controller 110 of the storage apparatus 10 via a communication network CN1, such as a LAN (Local Area Network), SAN (Storage Area Network), or the like. The host 20 reads and writes data from and to a volume 223 (refer to FIG. 3) provided inside the storage apparatus 10.

The management terminal 30, for example, is constituted as a computer device such as a personal computer, mobile computing device, or the like, and, for example, is connected to the main controller 110 of the storage apparatus 10 via a LAN or other such communication network CN2. Further, the management terminal 30 can also be connected to the management server 40 via a LAN, the Internet or other such communication network CN3. The management server 40 can be connected to a plurality of management terminals 30, and, for example, can also perform statistical analysis on information collected by the respective management terminals 30.

The management terminal 30 comprises a user interface (abbreviated as "UI" in the figure) 31 for management purposes. A user can utilize the management user interface 31 to change the configuration of the storage apparatus 10, and/or to acquire various information (performance information, environment information, and the like) from the storage apparatus 10. Furthermore, the management terminal 30 can collect, either on a regular or irregular basis, information related to various states of the storage apparatus 10 without waiting for instructions from a user.

Furthermore, for this embodiment, an example of a case, in which the management terminal 30 manages the state of the storage apparatus 10, is cited. But the present invention is not limited to this, and the constitution can be such that the host 20 is provided with a storage management program, and the host 20 manages the storage apparatus 10.

The constitution of the storage apparatus 10 will be explained. The storage apparatus 10, for example, is constituted comprising a main casing 100, and an expansion casing 200, and the main casing 100 and expansion casing 200 are connected via a SAN or other such communication channel CN5. The main casing 100 is the casing in which the basic functionality for controlling the operation of the storage apparatus 10 is concentrated, and the expansion casing 200 is an optional casing added as an option in accordance with the desires of the user.

The main casing 100, for example, can be equipped with a main controller 110, a main power supply part 140, and a plurality of the company's devices 300 and other companies' devices 400. A plurality of mounting parts 120, 130 are provided in the main casing 100. The respective mounting parts 120, 130 each comprise a plurality of slots. For example, the company's devices 300 are mounted to the slots 121 of the one mounting part 120 (refer to FIG. 4), and other companies' devices 400 are mounted to the slots 131 of the other mounting part 130 (refer to FIG. 4).

As explained hereinabove, the company's devices 300 are devices provided by the storage apparatus 10 vendor, and the main controller 110 comprises an interface for acquiring environment information. By contrast, other companies' devices 400 are devices provided by vendors other than the storage apparatus 10 vendor, and the main controller 110 cannot directly acquire environment information from other companies' devices 400.

As the company's devices 300, for example, a disk drive such as a hard disk drive, and a NAS system can be cited. As other company's devices 400, for example, a security server, switching system and the like can be cited. Thus, the company's devices 300 and other companies' devices 400 co-exist in the main casing 100 of the storage apparatus 10. Furthermore, the types of devices described above are examples, and the present invention is not limited thereto.

The expansion casing 200, for example, is equipped with a main power supply part 210, and a plurality of hard disk boxes 220. A plurality of disk drives 221 (refer to FIG. 3) is mounted in a hard disk box 220.

The main power supply part 140 of the main casing 100 and the main power supply part 210 of the expansion casing 200 are respectively connected to a customer's breaker (main breaker) 12, which supplies the alternating current power. The main power supply parts 140, 210 are constituted so as to supply the alternating current power from the customer's breaker 12 to various parts inside the casing either as-is, or by adjusting or converting the alternating current power from the customer's breaker 12 as needed. This in-casing power supply structure will be explained below, but first the overall constitution of the storage apparatus 10 will be explained.

Figure 3:
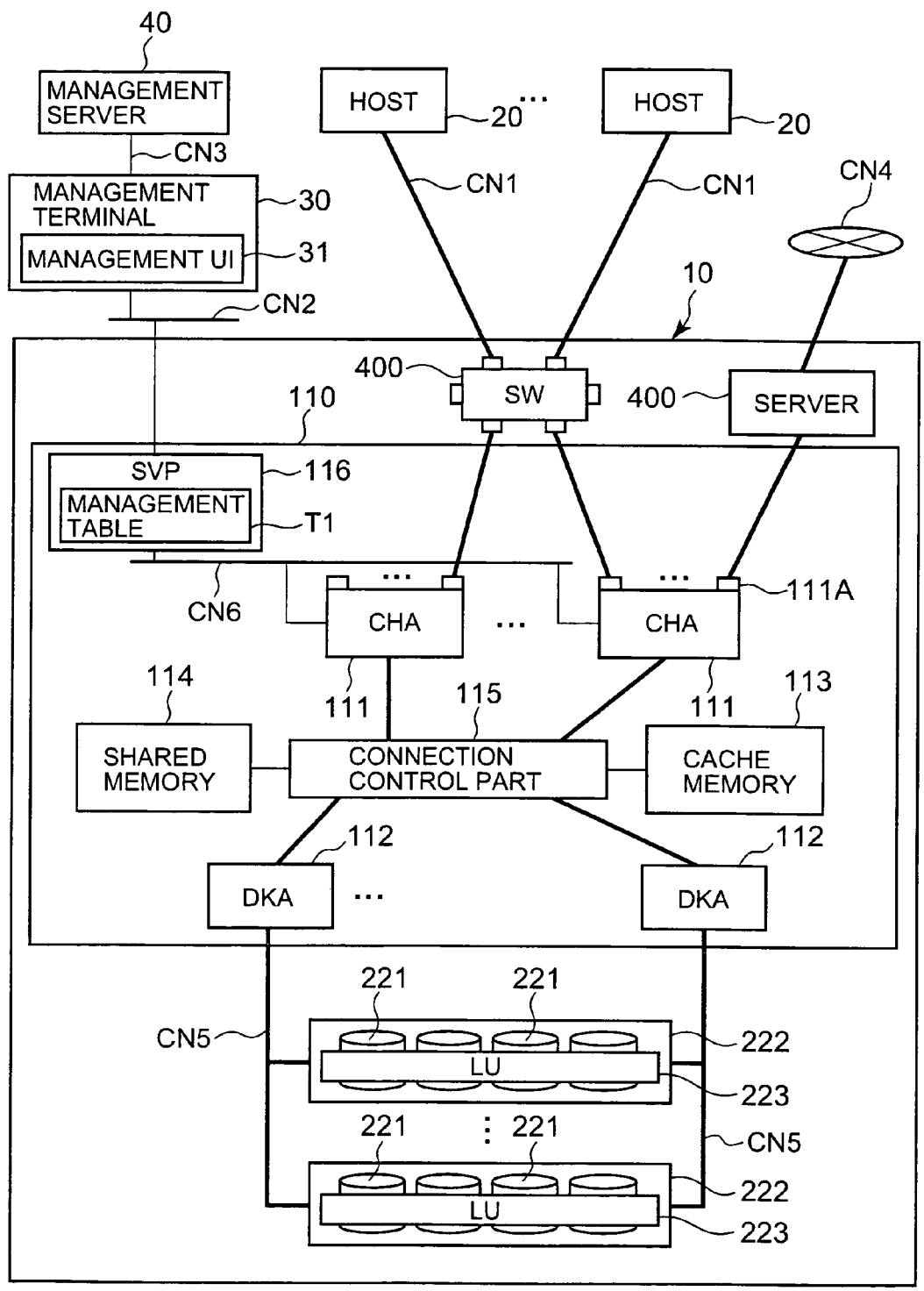
FIG. 3 is a block diagram of a storage apparatus.

FIG. 3 is a block diagram of the storage apparatus 10. Using FIG. 3, the fundamental constitution and operation of the storage apparatus 10 will be explained. The main controller 110 of the storage apparatus 10, for example, can be constituted comprising a plurality of channel adapters 111, a plurality of disk adapters 112, a cache memory 113, a shared memory 114, a connection control part 115, and a service processor 116. Furthermore, in the explanation that follows, a channel adapter 111 will be abbreviated as CHA 111, a disk adapter 112 will be abbreviated as DKA 112, and the service processor 116 will be abbreviated as SVP 116.

A CHA 111 controls the transfer of data between the storage apparatus 10 and the host 20, and comprises a plurality of communication ports 111A. A plurality of CHA 111 can be disposed in the storage apparatus 10. A CHA 111, for example, is provided in accordance with the type of host 20, such as a CHA for use with an open system server, a CHA for use with a mainframe system, and so forth. The respective CHA 111 receive commands, which request the reading and writing of data, from a host 20 connected thereto, and operate in accordance with the command received from the host 20.

A plurality of DKA 112 can be provided inside the storage apparatus 10. The DKA 112 control data communications between the storage apparatus 10 and the respective disk drives 221. The DKA 112 and the disk drives 221 carry out data transfer in block units in accordance with the fibre channel protocol. The DKA 112 monitor the state of the disk drives 221 at all times, and send the results of this monitoring to the SVP 116 via a network CN6.

Furthermore, the CHA 111 and DKA 112 can be constituted as separate control circuit substrates, or CHA functionality and DKA functionality can also be provided in a single control circuit substrate.

The cache memory 113, for example, stores data read out by a host 20, or data written in from a host 20. The shared memory (or control memory) 114 stores various control information and management information for controlling the operation of the storage apparatus 10.

Furthermore, the cache memory 113 and shared memory 114 can be constituted as separate memory circuit substrates, or the cache memory 113 and the shared memory 114 can be implemented inside a single memory circuit substrate. Further, the constitution can be such that one portion of cache memory is used as a control region for storing control information, and the other portion is used as a cache region for storing data.

The connection control part 115 is connected to each of the CHA 111, DKA 112, cache memory 113, and shared memory 114. This makes access possible to all of the CHA 111, DKA 112, cache memory 113 and shared memory 114. The connection control part 115, for example, is constituted as a crossbar switch or the like.

The SVP 116 is connected to each of the CHA 111 via an internal network CN6. The SVP 116, for example, can also acquire the states of the respective DKA 112 by way of the CHA 111 and shared memory 114. The SVP 116 acquires information related to various states inside the storage apparatus 10, and provides this information to the management terminal 30. Further, the SVP 116 can also change the configuration of the storage apparatus 10 on the basis of instructions from the management terminal 30.

Next, the storage structure of the storage apparatus 10 will be explained. The storage apparatus 10 can comprise a plurality of disk drives 221. As disk drives 221, for example, a hard disk drive, semiconductor memory drive, optical disk drive, magneto-optical disk drive, and magnetic tape drive can be cited. Further, when a disk drive 221 is constituted as a hard disk drive, for example, a SATA (Serial AT Attachment) disk, FC (Fibre Channel) disk can be cited. It is also possible to mix different types of hard disk drives together.

Either one or a plurality of logical volumes (abbreviated as "LU" in the figure) 223 can be generated using the storage region of a disk drive 221. This logical volume 223 is called a logical storage device. For example, either one or a plurality of logical volumes 223 can be created in the storage region of a single disk drive 221. Or, the storage regions of a plurality of disk drives 221 can be grouped together to provide either one or a plurality of logical volumes 223. A group 222 such as this is called a parity group or a RAID group. The management terminal 30 establishes an access bus between a host 20 and a logical volume 223, and provides the logical volume 223 to the host 20. The host 20 performs the reading and writing of data by accessing this logical volume 223.

Data input/output processing in accordance with the main controller 110 will be explained. A CHA 111 stores a read command received from a host 20 in shared memory 114. A DKA 112 constantly references stored memory 114, and when an unprocessed read command is detected, reads out data from a disk drive 221, and stores it in cache memory 113. A CHA 111 reads the data copied to the cache memory 113, and sends it to the host 20.

When a CHA 111 receives a write command from a host 20, it stores the write command in shared memory 114. The CHA 111 stores the received write data in the cache memory 113. After storing the write data in the cache memory 113, the CHA 111 notifies write-complete to the host 20. A DKA 112 reads the write data stored in the cache memory 113 in accordance with the write command stored in shared memory 114. The DKA 112 stores the write data in the disk drive 221 constituting the logical volume 223 specified as the write destination. Furthermore, the constitution can also be such that the DKA 112 notifies the host 20 of a write-complete after writing the write data to the disk drive 221.

Figure 4:
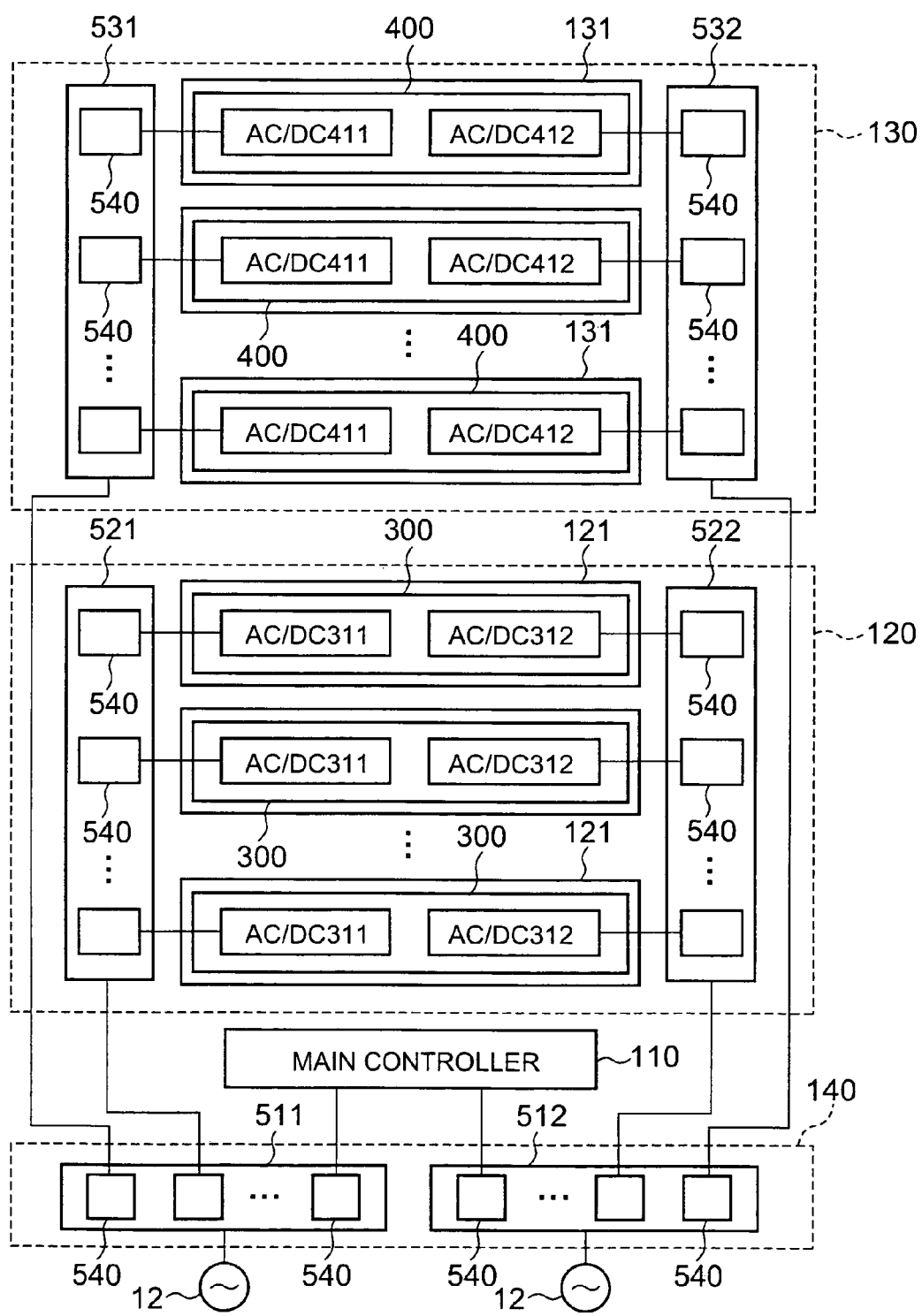
FIG. 4 is a schematic diagram showing the power supply structure of the storage apparatus.

FIG. 4 is a diagram schematically showing the power supply structure of the storage apparatus 10. The following explanation will focus on the main casing 100. A plurality of power distribution units 521, 522, 531, 532 are disposed in the respective mounting parts 120, 130. That is, in one mounting part 120, power distribution units 521 and 522 are provided on the left and right sides. Similarly, in the other mounting part 130, power distribution units 531 and 532 are provided on the left and right sides. Furthermore, in the following explanation, there will be times when a power distribution unit is abbreviated as "PDU".

The main power supply part 140 also comprises a plurality of main PDUs 511, 512, and the PDUs 521, 522, 531, 532 inside the mounting parts 120, 130 are connected to these main PDUs 511, 512. There will be times when PDUs 521, 531 and so forth inside these mounting parts 120, 130 are called sub-PDUs.

The respective PDUs 511, 512, 521, 522, 531, 532 comprise a plurality of power supply ports 540. Sub-PDUs 521 and 531 are respectively connected to the power supply ports 540 of the main PDU 511 shown in the left side of the figure. Therefore, alternating current power from the customer's breaker 12 is supplied to these sub-PDUs 521, 531 via the main PDU 511. Similarly, sub-PDUs 522 and 532 are respectively connected to the power supply ports 540 of the main PDU 512 shown in the right side of the figure. Therefore, alternating current power from the customer's breaker 12 is supplied to these sub-PDUs 522, 532 via the main PDU 512.

Thus, the storage apparatus 10 comprises a plurality of (two) power supply channels: a first power supply channel comprising the main PDU 511 and the respective sub-PDUs 521, 531, and a second power supply channel comprising the main PDU 512 and the respective sub-PDUs 522, 532. That is, the power supply channel of the storage apparatus 10 has been made redundant, and even if a failure should occur in one of the channels, power can be fed via the other, normal channel.

As explained hereinabove, the mounting part 120 comprises a plurality of slots 121, and the company's devices 300 are mounted in these slots 121. The mounting part 130 also comprises a plurality of slots 131, and other companies' devices 400 are mounted in these slots 131. Thus, different types of devices 300, 400 are mounted in the respective mounting parts 120, 130.

The company's devices 300 comprise a plurality of AC/DC power supply parts (hereinafter, "power supply parts") 311, 312. Similarly, the other companies' devices 400 also comprise a plurality of power supply parts 411, 412. This makes the internal power supply units of the respective devices 300, 400 redundant.

Then, either the pair of power supply parts 311 and 312, or the pair of power supply parts 411 and 412 is connected to respectively different power supply channels (PDU). That is, in the case of the company's devices 300, one power supply part 311 is connected to PDU 521, and the other power supply part 312 is connected to PDU 522. Similarly, in the case of the other companies' devices 400, one power supply part 411 is connected to PDU 531, and the other power supply part 412 is connected to PDU 532. Furthermore, to expedite the explanation, both the company's devices 300 and the other companies' devices 400 are described here as though their internal power supply parts have been made redundant, but in actuality, they differ in various ways in accordance with the specifications of the respective vendors. It is possible that at least a portion of the other companie' devices 400 will not comprise redundant internal power supplies.

Figure 5:
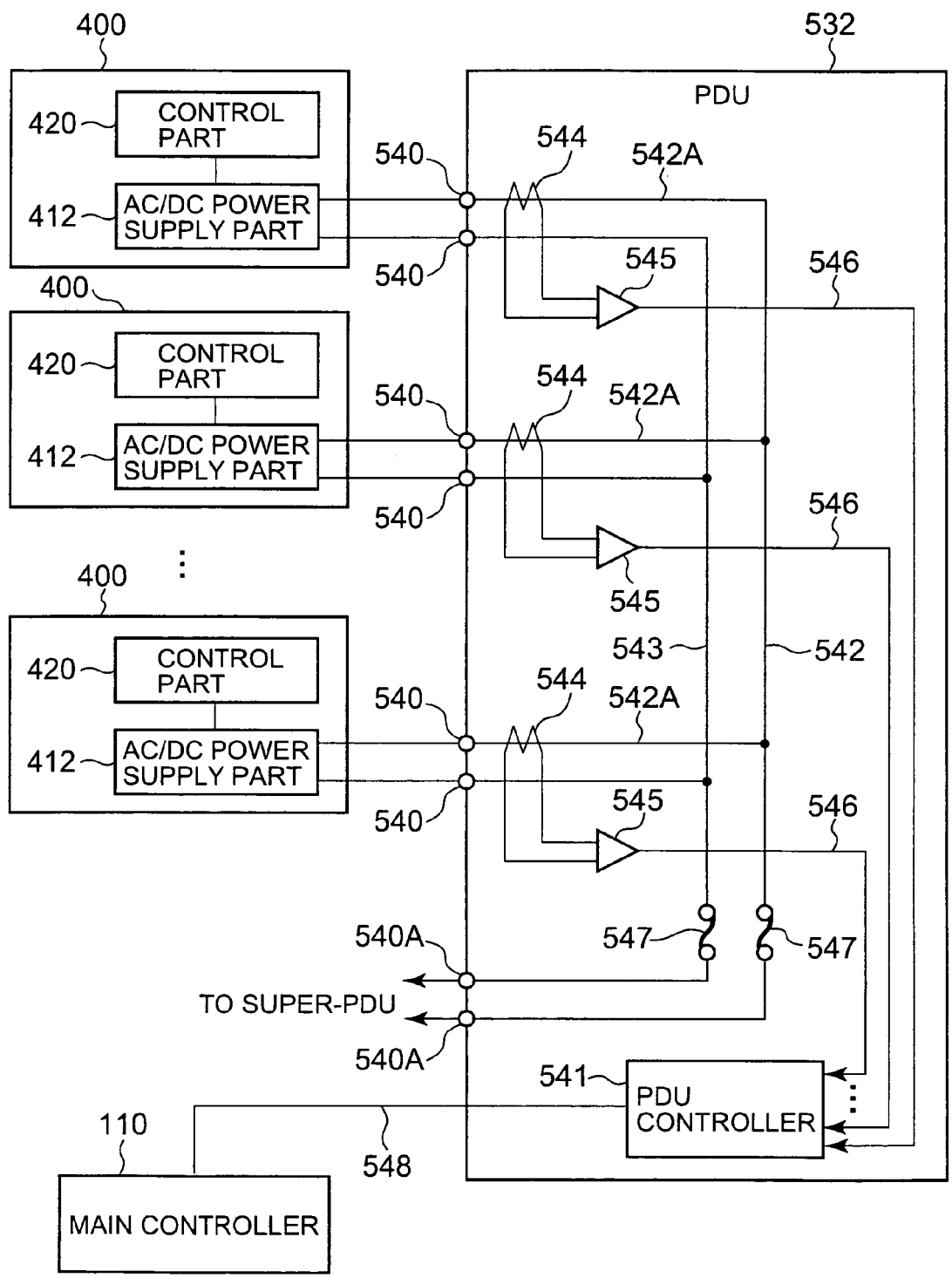
FIG. 5 is a circuit diagram showing the connection state between a PDU and another company's device.

The constitution for supplying power to the other companies' devices 400 will be explained using FIG. 5. Since the sub-PDU's 531, 532 each comprise the same constitution, for the sake of expediting the explanation, this constitution will be explained by giving the sub-PDU 532 as an example. Further, as explained hereinabove, the other companies' devices 400 can each comprise a plurality of power supply parts 411, 412, but in FIG. 5, only the power supply part 412 corresponding to the PDU 532 shown in the figure is shown.

First, by way of offering a simplified explanation of the constitution of the other companies' devices 400, another company's device 400, for example, can comprise a power supply part 412 and a control part 420. The power supply part 412 converts the alternating current power supplied from the PDU 532 to direct current, and supplies it to the respective parts of the other company's device 400. The control part 420 controls the operation of the other company's device 400.

The PDU 532, for example, is constituted comprising a set of two power supply ports (hereinafter, "ports") 540, a PDU controller 541, power supply channels 542, 543, a current sensor 544, an operational amplifier (op amp) 545, a signal line 546, and a fuse 547.

A plurality of ports 540 constitutes a set of two ports, and is connected to another company's device 400 as a set. One port 540 in a set is connected to either a superordinate PDU or a customer's breaker 12 via the channel 542. The other port 540 is connected a superordinate PDU (in the case of PDU 522, this is the main PDU 512) via the other channel 543. In the case of PDU 521, the superordinate PDU becomes main PDU 511.

As explained hereinabove, in a set of two ports 540, one port 540 constitutes the high-voltage side, and the other port 540 constitutes the low-voltage side. In the following explanation, a set of ports 540, 540 will simply be called a port 540.

A PDU controller 541 corresponds to a "monitoring part". The PDU controller 541 detects the presence or absence of a power failure by comparing detection signals from the current sensors 544 against a threshold value set by the main controller 110. The current value detected in each port 540 (in each other company's device 400), as will be explained below, is compared by the PDU controller 541 against both a low current threshold value IL and an overcurrent threshold value IH. Furthermore, the constitution can also be such that only the low current threshold value IL is compared. This is because, when the power supply part 412 of another company's device 400 comprises a fuse or other such overcurrent protection function, the current value decreases immediately after an overcurrent occurs.

The PDU controller 541 is connected to the main controller 110 by way of a channel 548 for control purposes. The main controller 110 sets the respective threshold values IL, IH in the PDU controller 541 via the control channel 548. The PDU controller 541 outputs a failure detection signal to the main controller 110 via the control channel 548.

Branch channels 542A, which branch to each of the ports 540, are provided for the one channel (line) 542. Current sensors 544 are disposed part way along the respective branch channels 542A.

As current sensors 544, for example, both contact-less and contact type methods are known. A contact-less type current detection method, for example, is one in which the current to be measured flows through the primary coil of a transformer, and is measured using the current value induced in the secondary coil. A CT (Current Transformer) type is known. As a contact type method, a method by which the current value is measured based on the two-terminal voltage of a resistor disposed midway along a branch channel 542A is known. Either method can be used, but for this embodiment, the use of a CT-type current sensor 544 will be explained. The output signals of the respective current sensors 544 are inputted to the PDU controller 541 via the signal line 546 after being amplified by the op amp 545.

Figure 6:
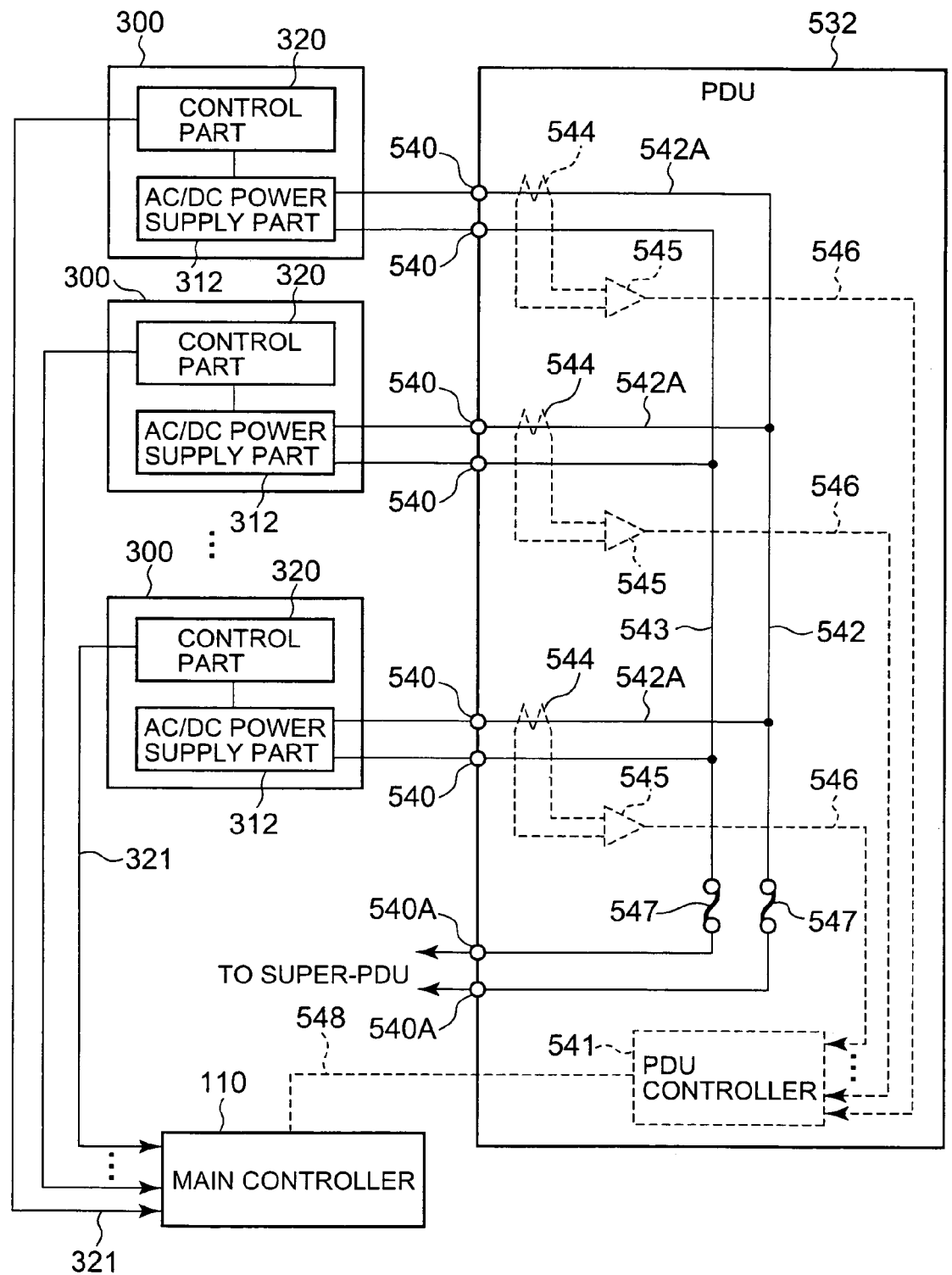
FIG. 6 is a circuit diagram showing the connection state between a PDU and the company's device.

FIG. 6 is a circuit diagram showing a constitution for supplying power to the company's devices 300. As explained using FIG. 5, the company's devices 300, for example, can be constituted comprising a power supply part 312 and a control part 320.

Of the plurality of power supply parts 311, 312 of a company's device 300, the PDU 522 for supplying power to the power supply part 312 can be constituted the same as the above-mentioned PDU 532. That is, this PDU 522, for example, can be constituted comprising a current sensor 544, and PDU controller 541.

However, in the case of a company's device 300, since the management channel 321 is connected to the main controller 110, the main controller 110 can directly acquire the environment information of the respective company's devices 300. Therefore, the PDUs 521, 522, which are used to supply power to the company's devices 300, do not necessarily have to comprise a PDU controller 541 and current sensor 544. In other words, the PDUs 521, 522 connected to the company's devices 300 can also be constituted as ordinary PDUs. In FIG. 6, this is signified by using dotted lines to show the constitution for detecting the presence or absence of failures by monitoring the current values to the company's devices 300.

However, there are circumstances in which the PDUs 521, 522 for use in the company's devices 300, and the PDUs 521, 522 for use in the other companies' devices 400 can clearly not be used separately. Further, making the constitutions of the respective PDUs 511, 512, 521, 522, 531, 532 the same can reduce the number of component parts, and lower the manufacturing costs of the storage apparatus 10. Further, it also makes it possible to reduce the number of PDUs for maintenance use, thereby enhancing the workability of maintenance work. Accordingly, for this embodiment, a case in which the PDUs 511, 512, 521, 522, 531, 532 feature the same constitution will be explained.

FIG. 7 is a schematic diagram showing a table T1 for managing the ports of a PDU. This table T1, for example, is maintained inside the SVP 116. Or, the table T1 can also be maintained either in shared memory 114, or inside the management terminal 30.

This management table T1, broadly divided, comprises three types of management information: T11, T12 and T13. The management table T1 is constituted by making this management information T11 through T13 correspondent.

A first management information T11 manages the connection relationship between the power supply parts 311, 312, 411, 412 built into the respective devices 300, 400, and the ports 540 of the respective PDUs. A second management information T12 manages information as to whether or not the devices 300, 400 connected to the ports 540 comprise redundant power systems, that is, whether or not these devices 300, 400 comprise a plurality of different built-in power supply parts. A third management information T13 manages either one or a plurality of threshold values for each port 540.

In the first management information T11, PDU identification information (PDU_ID) for uniquely identifying the respective PDUs inside the storage apparatus 10, a port number for distinguishing the respective ports 540 of a PDU identified by PDU identification information, and connection destination power supply part identification information (connection destination power supply part ID) for identifying the power supply parts of the devices 300, 400 connected to the respective ports 540 are made correspondent to one another. The information for identifying the power supply parts to which the ports 540 are connected can be arbitrarily set by the user. This can be information capable of uniquely specifying the respective power supply parts 311, 312, 411, 412 of the devices 300, 400 inside the storage apparatus 10. For example, information for identifying the respective power supply parts 311, 312, 411, 412 can be set by combining either all or part of the model numbers of the respective devices 300, 400 and product names with serial numbers. The main controller 110, by referencing the first management information T11, can detect which port 540 is connected to which power supply part of which device.

In the second management information T12, flag information indicating the presence or absence of redundancy, and redundant power supply part identification information (redundant power supply part ID) for identifying redundant power supply parts are made to correspond to one another. When the power supply units of the devices 300, 400 are redundant, "YES" is set in the "Redundancy?" field. Furthermore, the redundant power supply part ID and connection destination power supply part ID are generated on the basis of the same rule. That is, the ID of a certain power supply part is used as the connection destination power supply part ID in T11, and as the redundant power supply part ID in T12.

In the third management information T13, a plurality of types of threshold values IL, IH are made to correspond with each port 540. These threshold values IL, IH, for example, can be set by the user via the management terminal 30. For example, the user can confirm the specifications of another company's device 400, and freely set a threshold value for detecting the occurrence of a failure.

Figure 8:
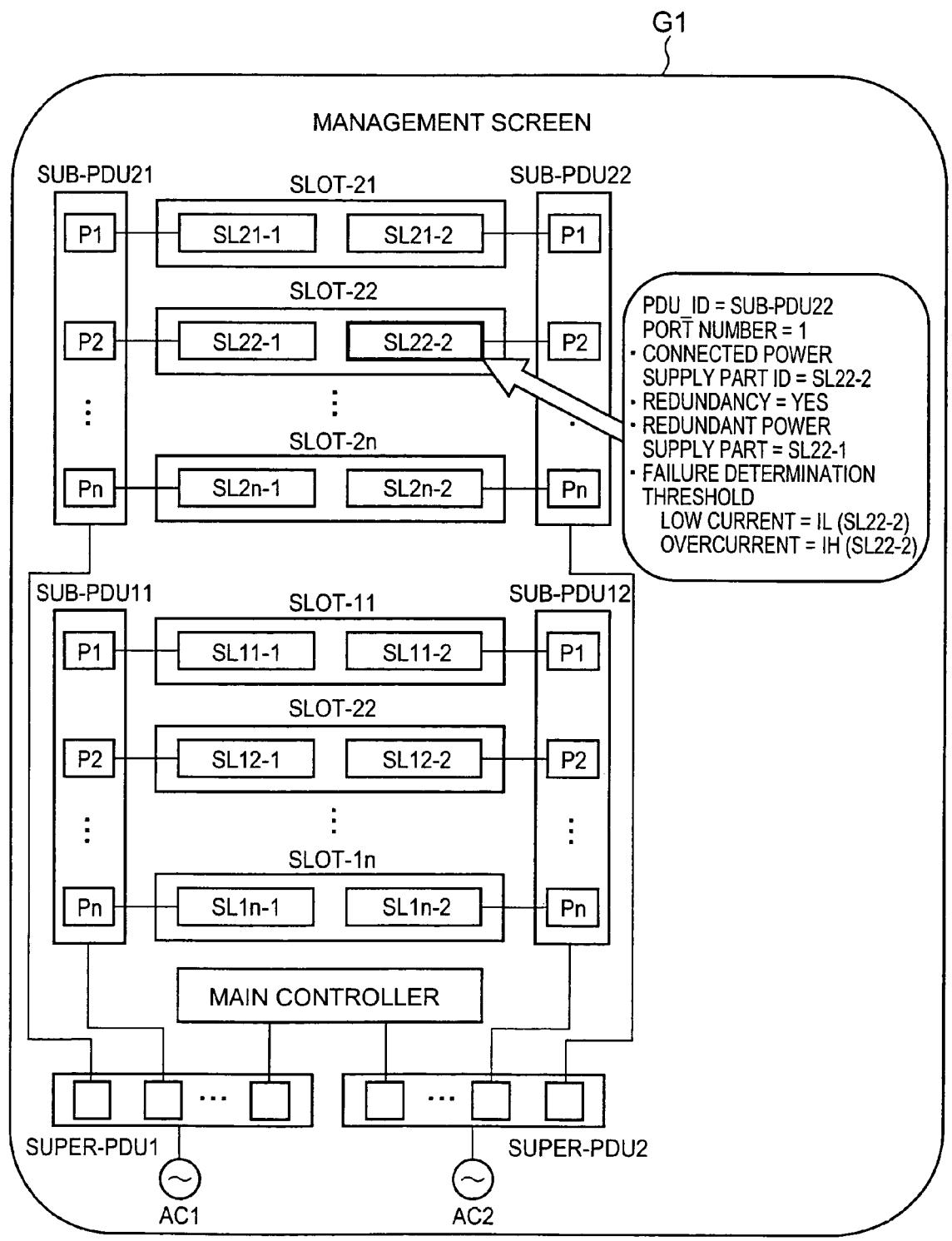
FIG. 8 is a schematic diagram showing a management screen.

FIG. 8 is a schematic diagram showing a management screen G1 for managing the power state of the storage apparatus 10. This management screen G1, for example, is displayed on the user interface 31 of the management terminal 30 in accordance with user instructions. Both the main casing 100 and the expansion casing 200 are capable of being displayed in the management screen G1, but for the purpose of expediting the explanation, the explanation will focus on the constitution of the main casing 100.

In the management screen G1, for example, either the logical or physical constitution related to the power supply structure of the storage apparatus 10 is displayed in a simplified manner. Each part related to the power supply structure of the storage apparatus 10, that is, for example, the relationship between the slots 121, 131, the respective power supply parts 311, 312, 411, 412 of the devices 300, 400 mounted to the slots, and the respective PDUs 511, 512, 521, 522, 531, 532, is schematically displayed in the management screen G1.

As indicated by the bold lines inside FIG. 8, the user, by selecting an arbitrary component from among the components displayed in the management screen G1, is able to obtain the detailed information of this selected component. For example, when the user uses a pointing device to select the power supply part specified by the power supply part ID "SL22-2", detailed information related to this selected power supply part is displayed inside the management screen G1. As the detailed information, for example, information related to the PDU to which this selected power supply part is connected (PDU_ID), a port number showing to which port this connection destination PDU is connected, the existence of redundancy, the power supply part ID of redundant power supply parts, and threshold values IL, IH for detecting the occurrence of a failure can be cited. This information is one example, and the present invention is not limited to this.

FIG. 9 is a schematic diagram showing the constitution of a PDU connection relation management table T2 for managing the connection relationship between PDUs. This table T2, for example, is maintained inside the SVP 116 the same as the above-mentioned PDU port management table T1. Or, this table T2 can also be maintained inside the shared memory 114 or management terminal 30. When the storage apparatus 10 is managed by a host 20, the respective tables T1, T2 can be stored inside the host 20.

Now then, the PDU connection relation management table T2 is constituted by corresponding identification information for identifying the respective PDUs (PDU_ID), flags indicating the presence or absence of a superordinate PDU, and a superordinate PDU_ID for specifying a superordinate PDU.

A superordinate PDU signifies a PDU, which is connected to a targeted PDU on the upstream side. Upstream side means the upstream side of a flow of current, and the PDUs located the furthest upstream constitute the PDUs 511, 512 (Super-PDU) inside the main power supply part 140. In the constitution example shown in FIG. 4, the super-PDU of PDUs 521, 531 is PDU 511, and the super-PDU of PDUs 522, 532 is PDU 512. Thus, table T2 manages the parent-child relationship between the respective PDUs.

Figure 10:
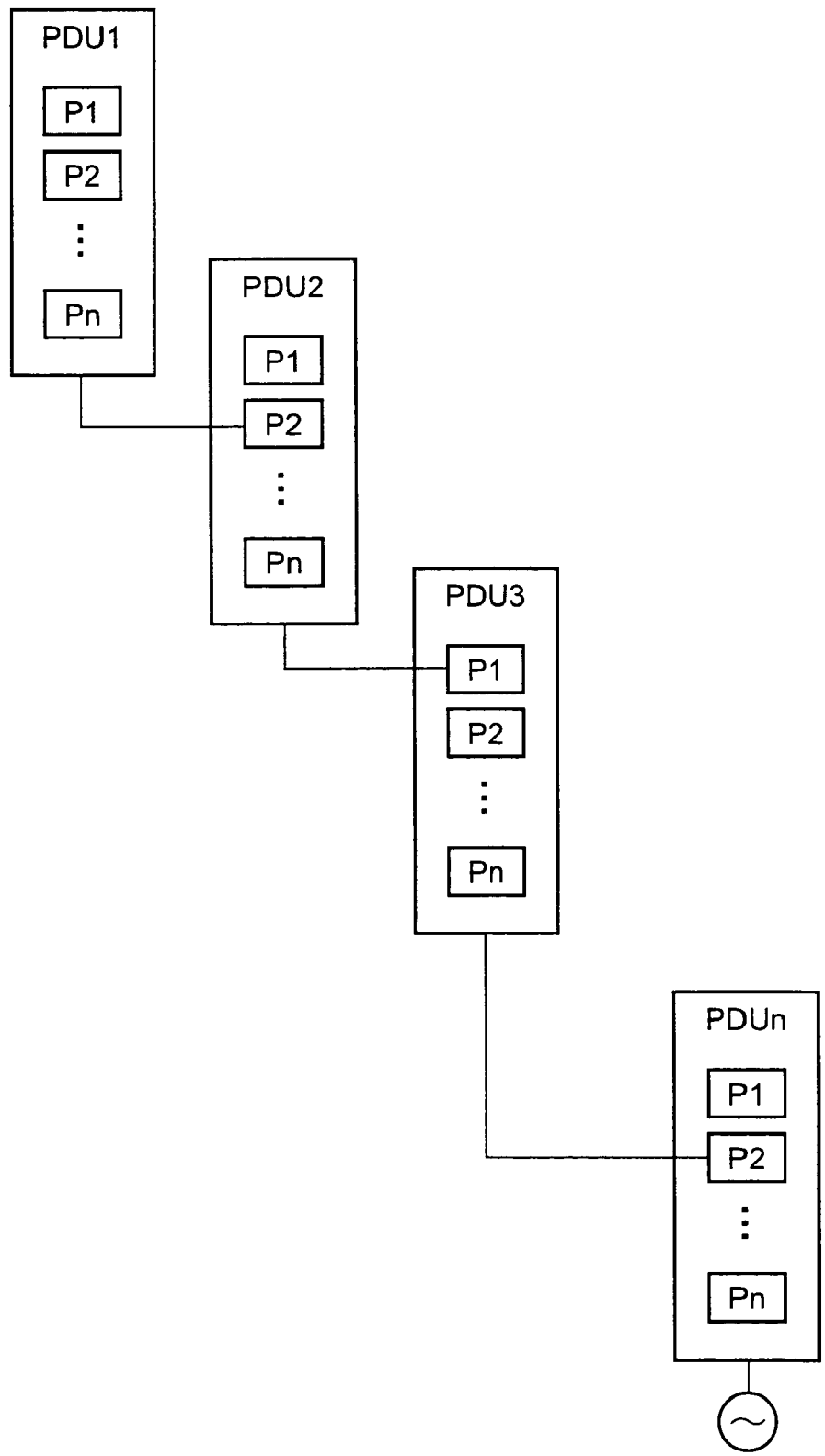
FIG. 10 is a diagram schematically showing another connection relationship between PDUs.

As shown in FIG. 10, more PDUs can also be connected in series. It is also possible to connect three or more PDUs by connecting a different PDU to a PDU port. FIG. 11 shows table 2 for managing the connection relationship (parent-child relationship) between the PDUs of the connection example shown in FIG. 10.

Figure 12:
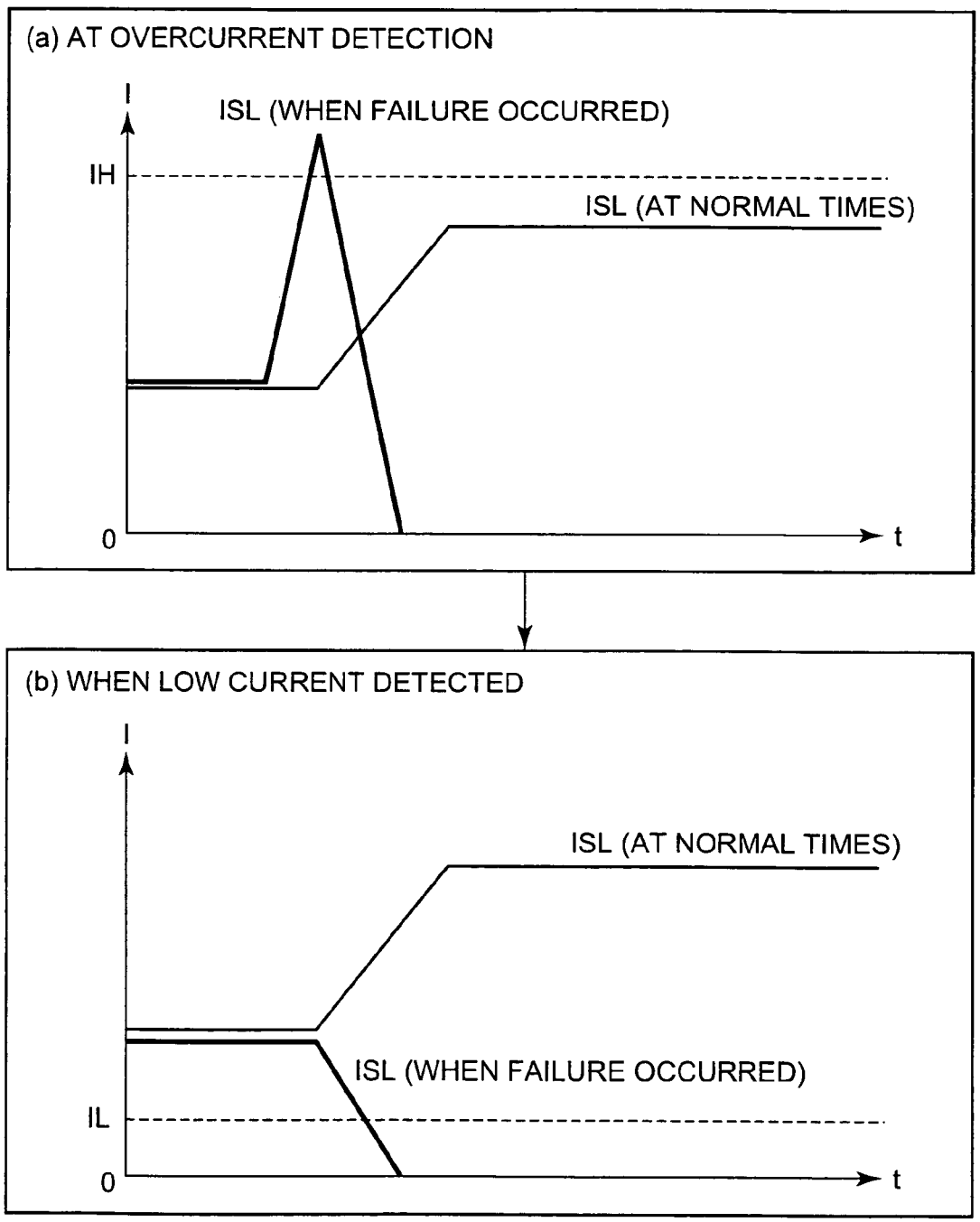
FIG. 12 is a schematic diagram showing the relationship between the value of a current supplied from a PDU to a power supply part inside a device, and a threshold value.

FIG. 12 is a schematic diagram showing the threshold values for detecting the occurrence of a failure. The user registers the respective threshold values IL, IH in the main controller 110 via the management terminal 30. The threshold values IL, IH are stored in the management table T1. Further, the threshold values IL, IH of each port, which are stored in the management table T1, are notified to the respective PDU controllers 541 by the main controller 110. Each PDU controller 541 monitors the state of the ports 540 under its own management based on self-set threshold values IL, IH.

Now then, FIG. 12A shows a case in which overcurrent is detected, and FIG. 12B shows a case in which low current is detected. The threshold value IH for detecting an overcurrent will be explained first. Furthermore, for the purpose of expediting the explanation, the power supply part 411 of another company's device 400 will be given as an example and explained.

It is supposed that when another company's device 400 is operating normally, current is supplied to the power supply part 411 inside the other company's device 400 as indicated by the thin line in FIG. 12A. The current value supplied in the power supply part 411 from the port 540 of the PDU 531 is detected by the current sensor 544, and inputted into the PDU controller 541.

The threshold value IH for detecting overcurrent, for example, can be set at an arbitrary value by virtue of the user referencing the specifications or operating instructions of the other companies' devices 400. For example, the user will set as the threshold value IH a value that is the same as the threshold value at which an overcurrent protection function (fuse or the like) built into another company's device 400 operates.

As indicated by the thick line in FIG. 12A, when, for example, an abnormality such as a short or the like occurs inside another company's device 400, the current value being supplied to the power supply part 411 suddenly rises. When the current value ISL exceeds the threshold value IH (ISL>IH), the PDU controller 541 determines that an overcurrent has been detected. Then, as will be explained hereinbelow, the PDU controller 541 notifies the main controller 110 of the port number and PDU_ID for which this overcurrent was detected.

Similarly, the threshold value IL for detecting a low current can also be arbitrarily set by the user for each port 540. When another company's device 400 comprises a redundant power supply part constitution, that is, when it is possible to supply electrical power to internal circuitry from a plurality of power supply parts 411, the user can set as the threshold value IL a value that is lower than the lowest current value of a power supply part 411 during normal operation. When a failure of some kind occurs inside another company's device 400, and the current value ISL falls below the threshold value IL (ISL<IL), the PDU controller 541 determines that a low current has been detected, and notifies the main controller 110.

Furthermore, as already explained, the constitution can also be such that only a threshold value IL for detecting a low current is set. For example, this is because there are cases when the overcurrent protection function inside the power supply part 411 will operate when an overcurrent occurs inside another company's device 400, and the current being inputted to the power supply part 411 from the port 540 will be cut off.

Figure 13:
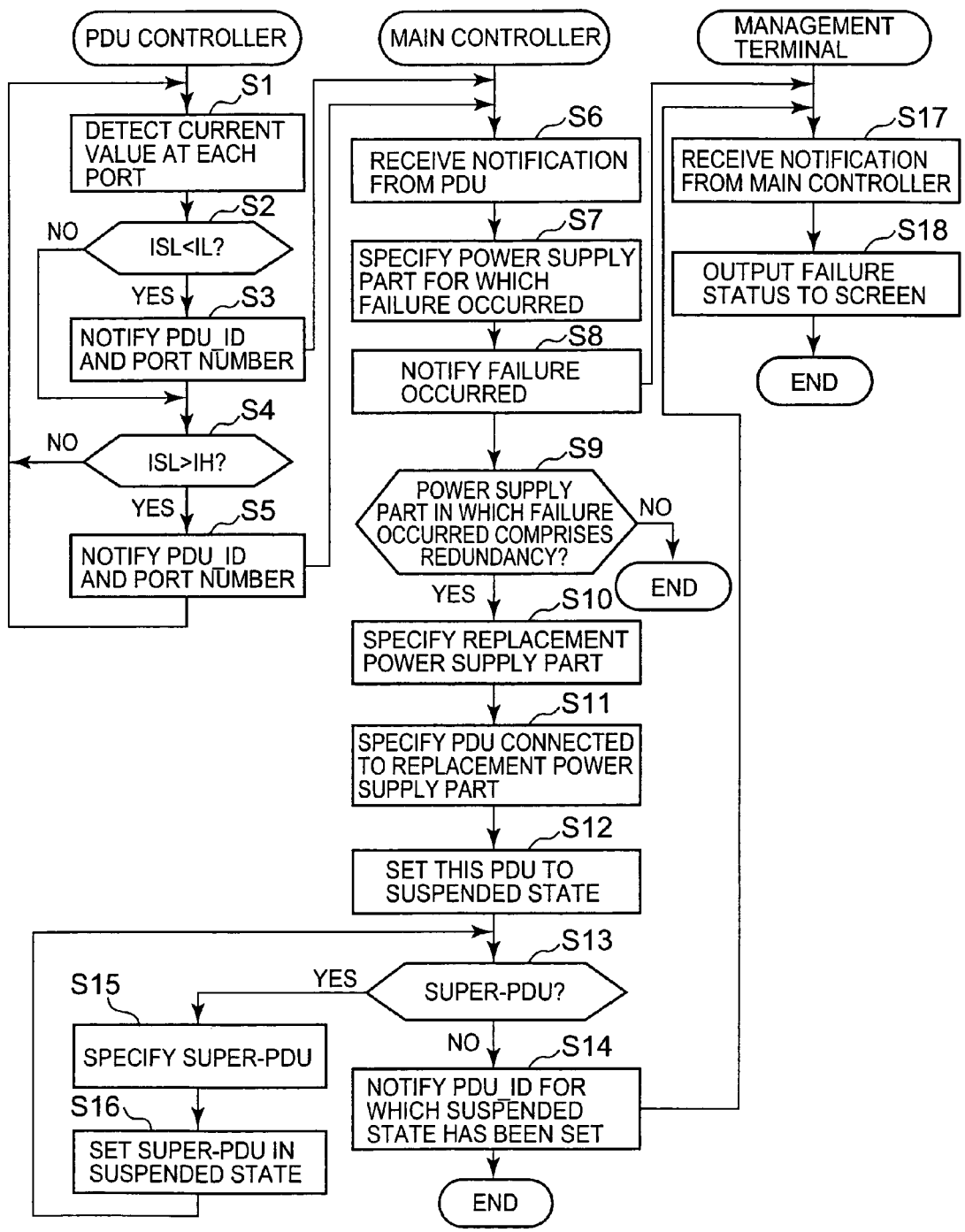
FIG. 13 is a flowchart showing a power supply management method.

FIG. 13 is a flowchart showing a power supply management method of the storage apparatus 10. This flowchart provides an overview of the processing needed to understand and implement the present invention, but there will be cases when the actual program will differ. In the figure, a step will be abbreviated as "S".

First, the PDU controller 541 inside the respective PDUs 511, 512, 521, 522, 531, 532, monitors the respective current values ISL outputted from the ports 540 under its management in accordance with detection signals from the respective current sensors 544 (S1).

The PDU controller 541 determines whether or not the detected current value ISL falls below the threshold value IL for detecting a low current (S2). When the detected current value ISL falls below the threshold value IL (S2: YES), the PDU controller 541 notifies the main controller 110 of the port number and PDU_ID of the port 540 where this abnormal current value ISL (<IL) was detected (S3).

When the detected current value ISL does not fall below the threshold value IL for detecting a low current (S2: NO), the PDU controller 541 determines whether or not the detected current value ISL is above the threshold value IH for detecting an overcurrent (S4). When the detected current value ISL exceeds the threshold value IH (S4: YES), the PDU controller 541 notifies the main controller 110 of the port number and PDU_ID of the port 540 where this abnormal current value ISL (>IH) was detected (S5). Furthermore, the sequence of the determinations is not limited to that described hereinabove. A detected current value ISL can be compared against the threshold value IH first, and next, the current value ISL can be compared against the threshold value IL.

Now then, the main controller 110 processes read requests and write requests from a host 20. When the main controller 110 receives a failure detected notification from a PDU controller 541 (S6), it specifies the power supply part 411 in which the failure was detected by referencing the first management information T11 of the PDU port management table T1 (S7). The main controller 110 clarifies the identification information (power supply part ID) of the specified power supply part, and notifies the management terminal 30 of the occurrence of a failure (S8).

Next, the main controller 110 determines whether or not the power supply part in which the occurrence of a failure was detected comprises redundancy by referencing the second management information T12 of the management table T1 (S9). That is, the main controller 110 determines whether or not there exists another power supply part, which constitutes a pair with the power supply part in which the failure occurred.

When the power supply part in which a failure occurred does not comprise redundancy (S9: NO), the main controller 110 ends power supply management processing. The main controller 110 ends this process after notifying the management terminal 30 of the occurrence of a failure (S8, S9).

When it is determined that the power supply part in which a failure occurred does comprise redundancy (S9: YES), the main controller 110 uses the second management information T12 of the management table T1 to specify the replacement power supply part (redundant power supply part), which forms a pair with the power supply part in which the failure occurred (S10). That is, the main controller 110 acquires the "redundant power supply part ID" of the second management information T12. Hereinafter, the replacement power supply part will be called the redundant power supply part.

The main controller 110 specifies the PDU to which the power supply part specified as the redundant power supply part is connected by using the first management information T11 and the second management information T12 of the management table T1 (S11). The main controller 110 sets this specified PDU to a suspended state (S12).

Here, suspended state signifies a state wherein operations, such as the replacement of a PDU and the stoppage of a function, are prohibited. For example, this is due to the fact that, if, in a situation in which a failure has occurred in one power supply part 411, the PDU 532 connected to the redundant power supply part 412 is replaced, there is the danger that the other company's device 400 will cease to function.

In addition, the main controller 110 references management table T2 to determine whether or not there is a super-PDU among the PDUs, which were set to the suspended state (S13). When a super-PDU exists (S13: YES), the main controller 110 specifies the super-PDU (S15), and sets this specified super-PDU to the suspended state as well (S16). This is because, if a PDU located above the PDU, which is directly connected to the redundant power supply part (can also be called the primary PDU), is replaced, it will not be possible to supply power to the redundant power supply part from a primary PDU thereinbelow, raising the fear that the other company's device 400 will cease to function.

The main controller 110 sequentially traces the parent-child relationships stored in the management table T2 (S13), and while so doing, specifies all the super-PDUs connected to primary PDUs (S15), and sets these specified super-PDUs to the suspended state (S16).

After setting all required PDUs to the suspended state, the main controller 110 notifies the management terminal 30 of the PDU_IDs of these suspended PDU (S14).

Upon receiving notifications (S8, S14) from the main controller 110 (S17), the management terminal 30 displays the state of the failure in the management screen G1 (S18). This enables the user to grasp the purport of the fact that a power supply part failure occurred.

Furthermore, since the operation of the PDUs is restricted (prohibited), for example, the constitution can also be such that each PDU is provided with a mechanical locking mechanism, prohibiting a PDU that has been set to the suspended state from being replaced. Further, the failure notification (S8) and the suspended state notification (S14) can also be carried out simultaneously.

Figure 14:
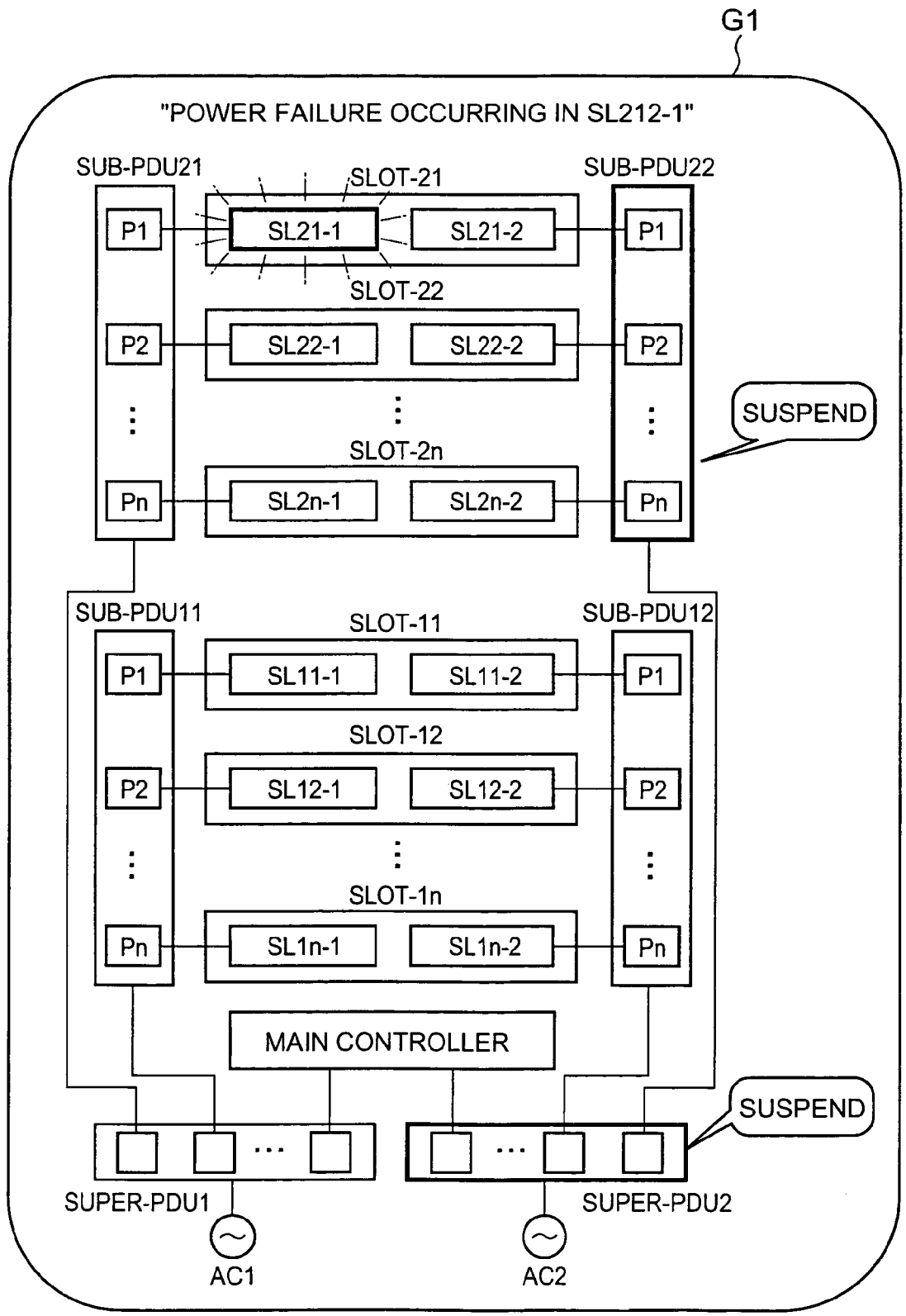
FIG. 14 is a schematic diagram showing a management screen when a failure occurs in a power supply part.

FIG. 14 is a schematic diagram showing the state of the management screen G1 when a failure has been detected. In FIG. 14, a situation in which a failure has occurred in a power supply part 411 of another company's device 400 is shown. The component, which symbolizes the failed power supply part, for example, is visually distinguished from other normal components by the fact that it flashes. Further, a PDU, which has been set to the suspended state, is displayed in a distinguishable condition from a PDU, which has not been set to the suspended state. This makes it possible for the user, by virtue of the management screen G1, to immediately grasp which power supply part of which device is exhibiting an abnormality, and which PDU is not to be operated. Furthermore, the constitution can also be such that the user is notified of the occurrence of a failure and the setting of the suspended state in accordance with a voice message, that either accompanies the screen output, or is used in place of the screen output.

Being constituted as described hereinabove, this embodiment displays the following effects. In this embodiment, the constitution is such that the current values supplied from the ports 540 of PDUs to the power supply parts 411, 412 of other companies' devices 400 are monitored, and a power supply part abnormality of another company's device is detected on the basis of the results of this monitoring. Therefore, a power supply part abnormality can be detected even when the main controller 110 is not able to acquire the environment information of other companies' devices 400, making it possible to enhance usability and reliability.

In this embodiment, the user can easily grasp the state of a power supply part abnormality because the constitution is such that the state of a power supply part abnormality is notified by associating same to the constitution of the storage apparatus 10.

In this embodiment, the constitution is such that a PDU, which is associated to a redundant power supply part of a power supply part for which an abnormality has been detected, is set to the suspended state, and operation thereof is restricted. Therefore, it is possible to prevent a PDU, which is connected to the redundant power supply part, from being inadvertently removed, making it possible to guarantee the operation of another company's device 400, which is being operated in accordance with the redundant power supply part.

Second Embodiment

Figure 15:
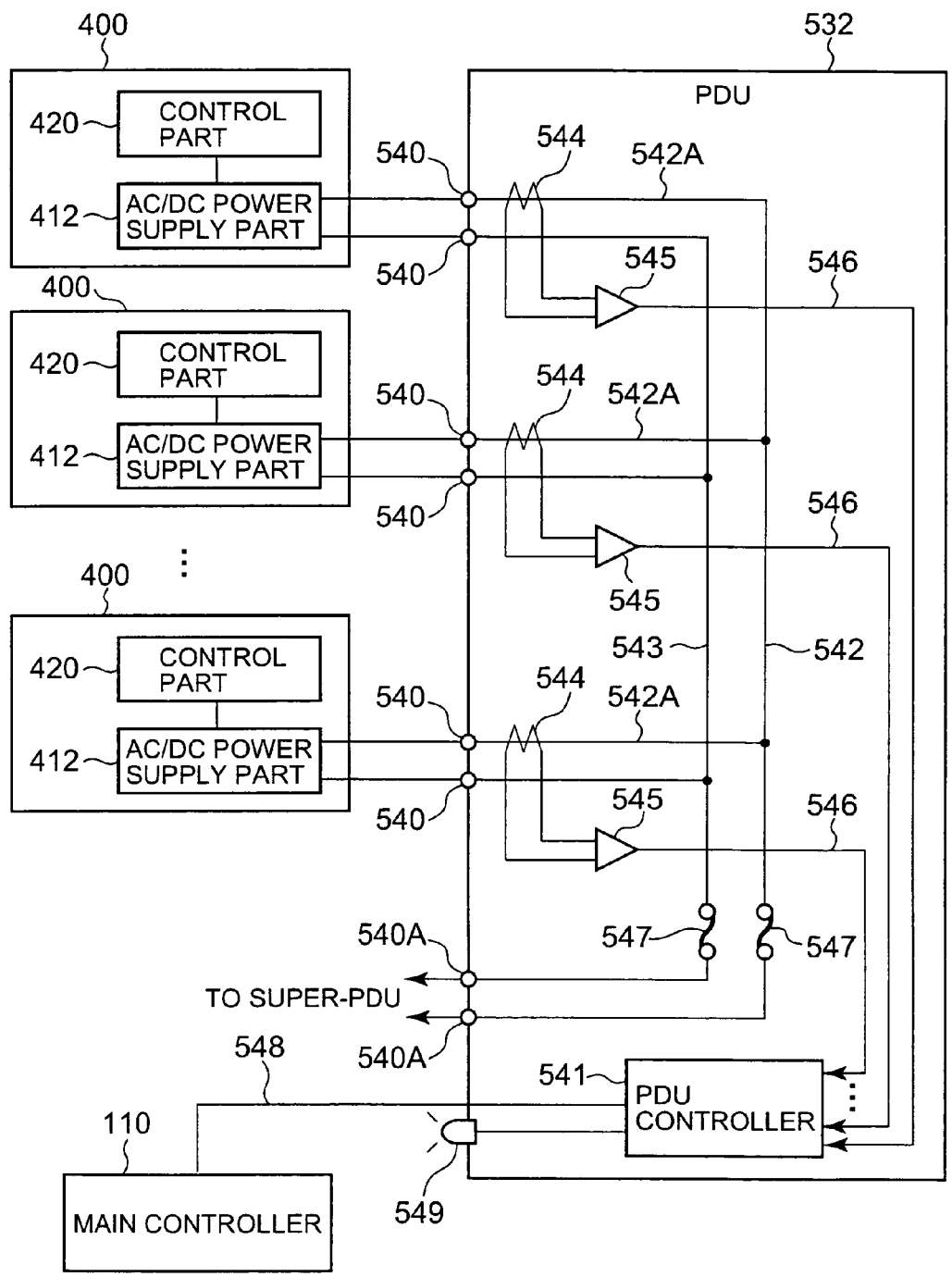
FIG. 15 is a circuit diagram showing the connection state between a PDU and another company's device, which are used in a storage apparatus related to a second embodiment.

A second embodiment of the present invention will be explained based on FIG. 15. This embodiment corresponds to a variation of the first embodiment. In this embodiment, a status notification lamp 549 is provided on each PDU 511, 512, 521, 522, 531, 532. When a PDU is set to the suspended state by the main controller 110, the PDU controller 541 notifies the user by either turning ON or flashing the status notification lamp 549.

This embodiment, which is constituted in this manner, also displays the same effects as the above-explained first embodiment. In addition, in this embodiment, the turning ON of a lamp 549 for a PDU that has been set to the suspended state makes it possible for the user to immediately determine a suspended state PDU when the casing of the storage apparatus 10 is open.

Furthermore, the present invention is not limited to the above-mentioned embodiments. Those having skill in the art will be able to make various additions and changes without departing from the scope of the present invention. For example, it is possible to combine the various embodiments as needed.

What is claimed is:

1. A storage system, comprising:
  a casing;
  a control part, which is disposed in the casing;
  a power supply part, which is disposed in the casing;
  a first type of load devices, each of which is disposed in the casing, and which has an interface for notifying environment information to the control part, and two in-device power supply parts made redundant for each other;
  a second type of load devices, each of which is disposed in the casing, and which has two in-device power supply parts made redundant for each other; and a first power distribution unit and a second power distribution unit, which are detachably disposed in the casing, and which distribute power from the power supply part to the respective load devices, wherein at least one the power distribution units comprises: a plurality of power supply ports each for delivering power to a corresponding one of the load devices; a detection part, which detects states of the power being delivered to the load devices from the power supply ports, and which outputs states of the power being delivered to the load devices from the power supply ports; and a monitoring part, which detects a power abnormality of the load devices by monitoring the detection signals outputted from the detection part, and notifies the control part, and wherein the control part, using management information in which corresponding relationship between the load devices and the power supply ports is set beforehand, specifies the load device in which the power abnormality caused by a failure occurs in he load device has been detected, and outputs information related to the specified load device, and specifies a prescribed power distribution unit which is connected the specified load device, and outputs alert information for restricting operations to the specified prescribed power distribution unit from being suspended.

2. A management method for managing a power abnormality state of at least one of load devices disposed in a storage apparatus, comprising:

connecting a plurality of power distribution units, which distribute power from a power supply part, to the load devices;

detecting respective states of power being delivered to the load devices from the power distribution units;

determining whether or not a power abnormality caused by a failure, which occurred inside one of the load devices, has occurred by comparing the detected power states against a preset threshold value;

specifying, when determined that the power abnormality has occurred, within the storage apparatus, the load device in which the power abnormality occurred by using management information in which corresponding relationships between the identification information of the load device, and information related to two in-device power supply parts made redundant for each other in some of the load devices and the power distribution units as set beforehand;

outputting a first alert information related to the specified load device;

determining whether or not the specified load device comprises said two in-device power supply parts made redundant for each other by using the management information;

specifying, when determined that the specified load device comprises said two in-device power supply parts made redundant for each other, a power distribution unit, which is connected to the specified load device; and outputting a second alert information related to the specified power distribution unit.

\* \* \* \* \*